United States Patent [19]

Lyons et al.

[11] Patent Number: 5,300,843

[45] Date of Patent: Apr. 5, 1994

[54] FAULT TOLERANT ACTIVE MAGNETIC BEARING

[75] Inventors: James P. Lyons; Mark A. Preston, both of Niskayuna; Gerald B. Kliman, Schenectady, all of N.Y.

[73] Assignee: General Electric Company, Schenectady, N.Y.

[21] Appl. No.: 970,197

[22] Filed: Nov. 2, 1992

[51] Int. Cl.⁵ .............................................. H02K 7/09
[52] U.S. Cl. .................................................. 310/90.5
[58] Field of Search ...................... 310/90.5, 156, 190, 310/256, 257, 259, 179, 191, 192; 384/9

[56] References Cited

U.S. PATENT DOCUMENTS

| | | | |
|---|---|---|---|
| 3,693,037 | 9/1972 | West | 310/190 X |
| 4,472,651 | 9/1984 | Jones | 310/156 |
| 4,504,098 | 3/1985 | Batterel et al. | 310/90.5 |
| 4,683,391 | 7/1987 | Higuchi | 310/90.5 |
| 4,918,831 | 4/1990 | Kliman | 310/156 X |
| 4,947,067 | 8/1990 | Habermann et al. | 310/90.5 X |
| 5,051,637 | 9/1991 | Harris et al. | 310/90.5 |

FOREIGN PATENT DOCUMENTS 0165014  7/1986  Japan ................................. 310/90.5

*Primary Examiner*—Emanuel T. Voeltz
*Assistant Examiner*—E. To
*Attorney, Agent, or Firm*—Jill M. Breedlove; Marvin Snyder

[57] ABSTRACT

A fault tolerant active magnetic bearing has at least three magnetically isolated control axes. To this end, the active magnetic bearing has a segmented stator which employs non-magnetic sections for magnetically isolating adjacent electromagnetic force actuators, and hence adjacent control axes. As a result, operating force actuators are not affected by magnetic poles experiencing a fault. Hence, in a three-phase active magnetic bearing rotor suspension control system, for example, full control of rotor shaft position can be maintained with only two functioning control axes.

5 Claims, 2 Drawing Sheets

BEARING AXES

BEARING AXES

BEARING AXES

FAULT TOLERANT ACTIVE MAGNETIC BEARING

RELATED PATENT APPLICATION

This application is related to commonly assigned U.S. patent application Ser. No. 07/970,194 of J. P. Lyons and M. A. Preston, and to commonly assigned U.S. patent application Ser. No. 07/970,196 of J. P. Lyons and M. A. Preston, both filed concurrently herewith and incorporated by reference herein.

FIELD OF THE INVENTION

The present invention relates generally to magnetic bearings and, more particularly, to a fault tolerant active magnetic bearing having at least three magnetically isolated control axes.

BACKGROUND OF THE INVENTION

Active magnetic bearings have great potential for improving the efficiency of rotating machinery by: reducing or eliminating the complexity of bearing lubrication systems; enabling high rotational speeds; and providing active means of controlling vibrations in complex rotating masses. Recent advances in power electronics and control microprocessors have made active magnetic bearing systems feasible in, for example, gas turbine engine applications.

Presently, however, active magnetic bearings are unsuitable for high-reliability applications, such as aircraft engine rotor support and vibration control. Accordingly, it is desirable to provide a highly reliable and fault tolerant active magnetic bearing.

SUMMARY OF THE INVENTION

A fault tolerant active magnetic bearing has at least three magnetically isolated control axes. To this end, the active magnetic bearing has a segmented stator which employs non-magnetic sections for magnetically isolating adjacent electromagnetic force actuators, and hence adjacent control axes. As a result, operating force actuators are not affected by force actuators experiencing a fault. Therefore, in a three-phase active magnetic bearing rotor suspension control system, for example, full control of rotor shaft position can be maintained with only two functioning control axes.

BRIEF DESCRIPTION OF THE DRAWINGS

The features and advantages of the present invention will become apparent from the following detailed description of the invention when read with the accompanying drawings in which:

FIG. 1b graphically represents the orthogonal control axes for the active magnetic bearing of FIG. 1a;

FIG. 2b graphically represents the magnetically isolated control axes for the active magnetic bearing of FIG. 2a.

DETAILED DESCRIPTION OF THE INVENTION

Figure 1A:
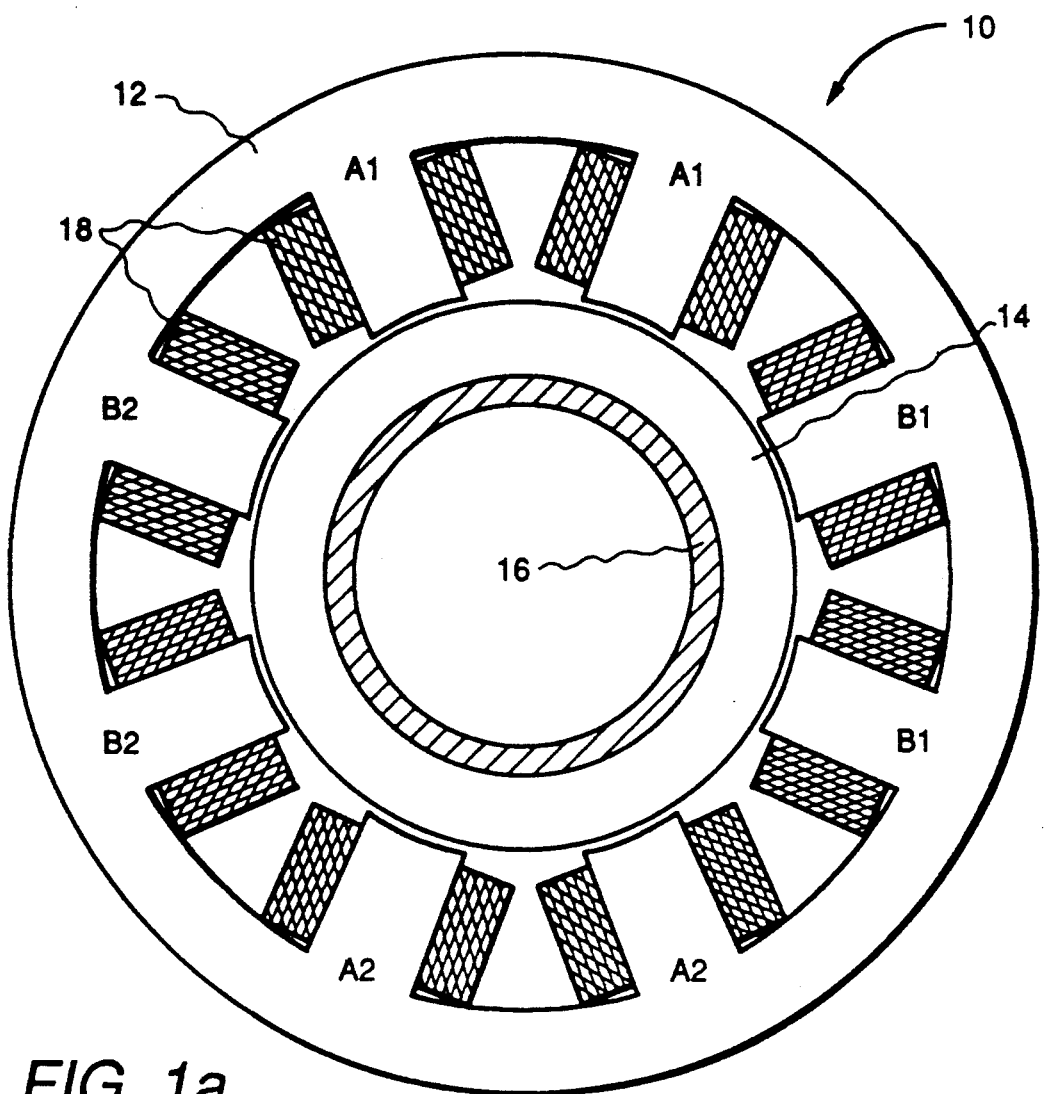
FIG. 1a illustrates a typical active radial magnetic bearing employing orthogonal control axes.
Figure 1B:
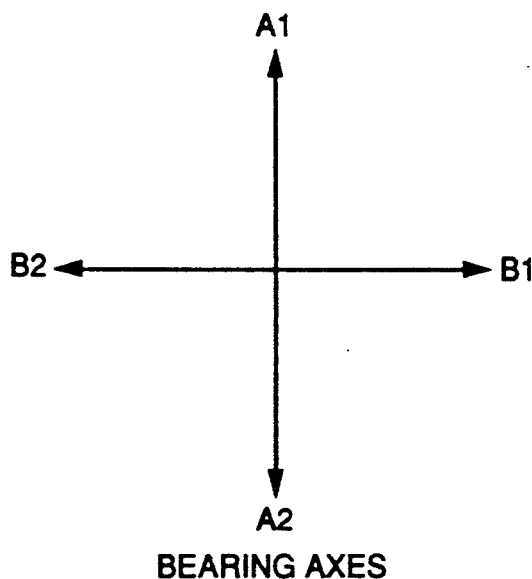

FIG. 1a illustrates a typical active radial magnetic bearing 10 employing orthogonal control axes. Active radial magnetic bearing 10 includes a stator 12 and a rotor 14 coupled to a shaft 16. By way of example, stator 12 is shown as having four stator pole-pairs configured as four force-producing electromagnets A1, A2, B1 and B2, with a 90° radial spacing between pole-pairs. Each stator pole has a winding 18 wound thereon in well-known manner. For example, windings 18 may comprise form-wound windings that are initially wound about a bobbin and then placed on the stator poles during magnetic bearing assembly. Two electromagnets at 180° radial separation operate as a respective one of the control axes. The orthogonal control axes are thus represented graphically in FIG. 1b as A1-A2 and B1-B2. Disadvantageously, in the active magnetic bearing configuration of FIG. 1a, both of the control axes are required to maintain stable rotor suspension.

Figure 2A:
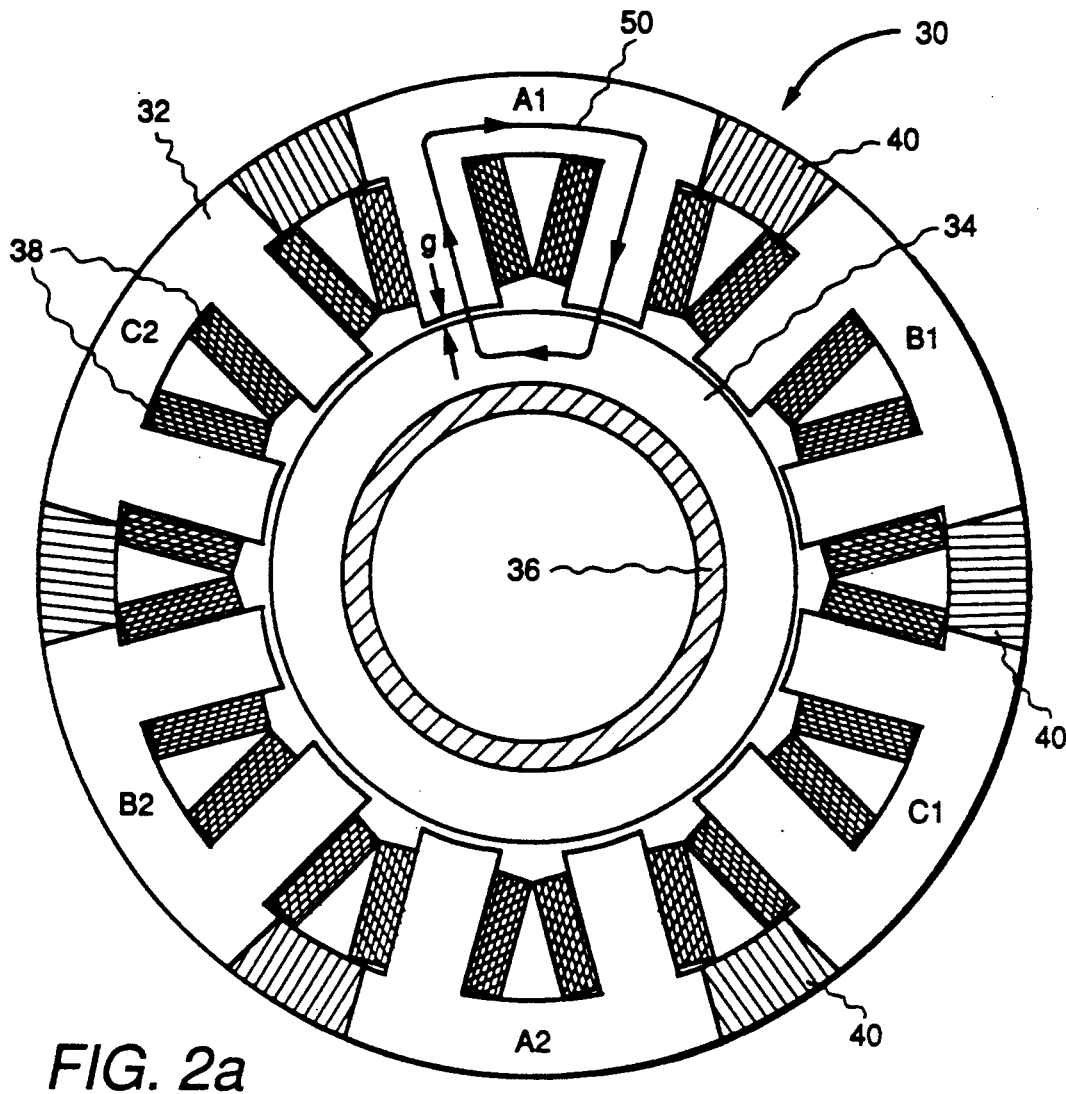
FIG. 2a illustrates an active radial magnetic bearing employing three magnetically isolated control axes in accordance with the present invention.
Figure 2B:
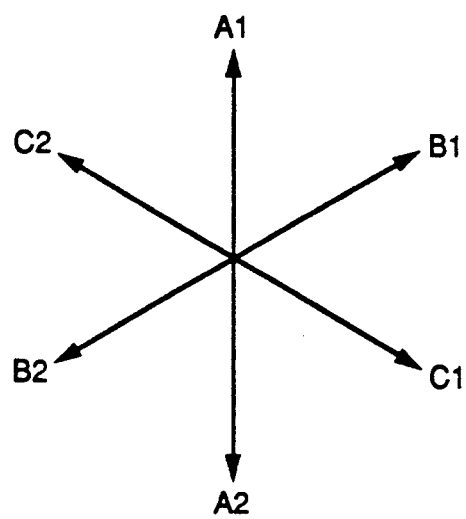

FIG. 2 illustrates an active magnetic bearing 30 employing at least three magnetically isolated radial control axes according to the present invention. Active magnetic bearing 30 includes a stator 32 and a rotor 34 coupled to a shaft 36. By way of illustration, stator 32 of active magnetic bearing 30 has six stator pole-pairs configured as six force-producing electromagnets A1, B1, C1, A2, B2, and C2, with a 60° radial spacing between pole-pairs. Each stator pole has a winding 38 wound thereon in well-known manner. Two electromagnets at 180° radial separation operate as a respective one of the control axes.

Stator 32 is segmented by situating a non-magnetic stator flux barrier 40 between adjacent electromagnets. The stator flux barriers 40 provide magnetic isolation for each electromagnet and thus allow functioning force-actuation electromagnets to continue operating even in such proximity to faulted electromagnets. Advantageously, any two of the three (or more) control axes are sufficient to maintain rotor suspension. Hence, bearing operation continues even in the presence of faults, such as, for example, faulted electromagnets, power electronic shorts, and phase power loss. Even greater fault tolerance may be achieved using more than three control axes.

In operation, the magnetic flux produced by the forcing current or magnetomotive force (mmf) in each pole winding 38 circulates through the stator poles of each respective electromagnet and through the rotor and stator cores, crossing two air gap lengths g. An exemplary magnetic flux path 50 for electromagnet A1 is illustrated in FIG. 2a. Advantageously, the magnetic coupling between adjacent electromagnets is minimized by the active magnetic bearing configuration of FIG. 2a, and the flux path for each electromagnet is isolated, enabling independent operation of the control axes and preventing interference between adjacent electromagnets under fault conditions.

The stator of an active magnetic bearing according to the present invention can be constructed using a stack of composite laminations in a manner such as that described in commonly assigned U.S. Pat. No. 4,918,831 of G. B. Kliman, issued Oct. 20, 1989 and incorporated by reference herein. Alternatively, the stator of an active magnetic bearing according to the present invention can be constructed by bonding (e.g., welding) solid non-magnetic segments to a stack of laminations in a manner such as that described in commonly assigned U.S. Pat. No. 4,472,651 of D. W. Jones, issued Sept. 18, 1984 and incorporated by reference herein.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An active magnetic bearing, comprising:
a rotor mounted for rotation within a stator and for coupling to a shaft, said stator having at least six adjacent electromagnets configured such that each electromagnet is situated opposite from a corresponding electromagnet, adjacent electromagnets being separated by non-magnetic flux barriers, opposite electromagnets functioning as a magnetically isolated control axis, such that there are at least three magnetically isolated control axes, and only two of said control axes are required to be operational in order to maintain operation of said magnetic bearing.

2. The active magnetic bearing of claim 1 wherein said stator has three control axes.

3. The active magnetic bearing of claim 1 wherein said electromagnets each comprise a stator pole-pair.

4. The active magnetic bearing of claim 1 wherein said stator comprises a stack of composite stator laminations.

5. The active magnetic bearing of claim 1 wherein said stator comprises a stack of laminations, said flux barriers comprising solid non-magnetic segments bonded to said laminations.

* * * * *